United States Patent
Berke et al.

(10) Patent No.: US 8,719,493 B2
(45) Date of Patent: May 6, 2014

(54) MEMORY CONTROLLER-INDEPENDENT MEMORY SPARING

(75) Inventors: Stuart Allen Berke, Austin, TX (US); William Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 13/426,296

(22) Filed: Mar. 21, 2012

(65) Prior Publication Data

US 2013/0254506 A1 Sep. 26, 2013

(51) Int. Cl.
*G06F 12/04* (2006.01)
(52) U.S. Cl.
USPC ............... 711/106; 711/165; 711/E12.022
(58) Field of Classification Search
USPC ............... 711/106, 165, E12.016, E12.022
See application file for complete search history.

(56) References Cited

U.S. PATENT DOCUMENTS

| | | | |
|---|---|---|---|
| 5,805,920 | A | 9/1998 | Sprenkle |
| 5,832,005 | A | 11/1998 | Singh |
| 7,694,093 | B2 | 4/2010 | Shaw et al. |
| 2005/0102480 | A1 | 5/2005 | Yagisawa et al. |
| 2008/0165600 | A1 | 7/2008 | Co et al. |
| 2008/0270675 | A1* | 10/2008 | Nagaraj et al. ............... 711/100 |
| 2009/0034669 | A1 | 2/2009 | Hampel et al. |
| 2010/0162037 | A1* | 6/2010 | Maule et al. ..................... 714/5 |
| 2011/0154104 | A1 | 6/2011 | Swanson et al. |
| 2011/0161784 | A1 | 6/2011 | Selinger et al. |
| 2012/0042204 | A1 | 2/2012 | Smith et al. |
| 2012/0239887 | A1* | 9/2012 | Magro et al. ................. 711/154 |

OTHER PUBLICATIONS

Stuart Allen Berke and William Sauber; "Memory Controller-Independent Memory Mirroring;" U.S. Appl. No. 13/323,428, filed Dec. 12, 2011; 36 Pages.

* cited by examiner

*Primary Examiner* — Hal Schnee
(74) *Attorney, Agent, or Firm* — Haynes and Boone, LLP

(57) ABSTRACT

An information handling system (IHS) includes a memory controller, a memory device, and firmware. A failing memory region and a spare memory region are included on the memory device. A memory buffer in the memory device is coupled to the failing memory region and the spare memory region. The memory buffer is operable to perform copy operations without instruction from the memory controller in order to copy data from the failing memory region to the spare memory region in response to firmware operations performed by the firmware. Firmware operations may include instructing the memory controller to produce additional refresh or calibration operation time periods, or providing an instruction to perform a data transfer operation to the spare memory region. The memory buffer is also operable to route requests from the memory controller to one of the failing memory region and the spare memory region during the copy operations.

17 Claims, 8 Drawing Sheets

US 8,719,493 B2

MEMORY CONTROLLER-INDEPENDENT MEMORY SPARING

BACKGROUND

The present disclosure relates generally to information handling systems (IHSs), and more particularly to providing memory sparing in an IHS independent of a memory controller.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Currently, it is common for an IHS that handles critical data to hold a region of memory in reserve (i.e. a 'spare' region such as, for example, a spare rank) to replace an active region of memory that develops unrecoverable or excessive recoverable errors. This is typically referred to as memory sparing. However, current systems for memory sparing have weaknesses that reduce their desirability. For instance, memory sparing may not be available on all processor types (e.g., lower cost processors). In addition, memory sparing may require a uniform population of DIMMs across the IHS, which limits the ability to create different levels of protection based on memory regions. Further, memory sparing is traditionally controlled by a memory controller in the IHS. Conventional memory controller controlled memory sparing systems create memory sparing associations based only on the regions of memory visible to the memory controller. However, in some IHSs the partitioning of physical memory regions (e.g., the physical ranks on buffered DIMMs and risers such as Load-Reduced Dual In-line Memory Modules (LRDIMMs) and 3D Through-Silicon Via (TSV) DIMMs) may be hidden from the memory controller, and thus those memory regions are excluded from the memory sparing system. Even further, memory sparing is not generally supported with other Reliability/Availability/Serviceability (RAS) features such as mirroring or lockstep. Finally, in conventional memory sparing systems controlled by the memory controller, when an active rank fails, system operations may be interrupted until the memory controller copies data from the active rank to a spare rank.

Therefore, what is needed in an improved memory sparing system.

SUMMARY

According to one embodiment, an information handling system used in a memory controller independent memory sparing system includes a memory controller, a memory device coupled to the memory controller and including a first memory region and a second memory region, and a memory buffer coupled to the first memory region and the second memory region, wherein the memory buffer is operable to perform copy operations without instruction from the memory controller in order to copy data from the first memory region to the second memory region, and wherein the memory buffer is operable to route requests from the memory controller to one of the first memory region and the second memory region during the copy operations, and firmware coupled to the memory buffer, wherein the firmware is operable to perform firmware operations to cause the memory buffer to perform the copy operations without instruction from the memory controller.

DETAILED DESCRIPTION

For the purposes of this disclosure, an information handing system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, a mobile communication device, or any other suitable device. The IHS may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
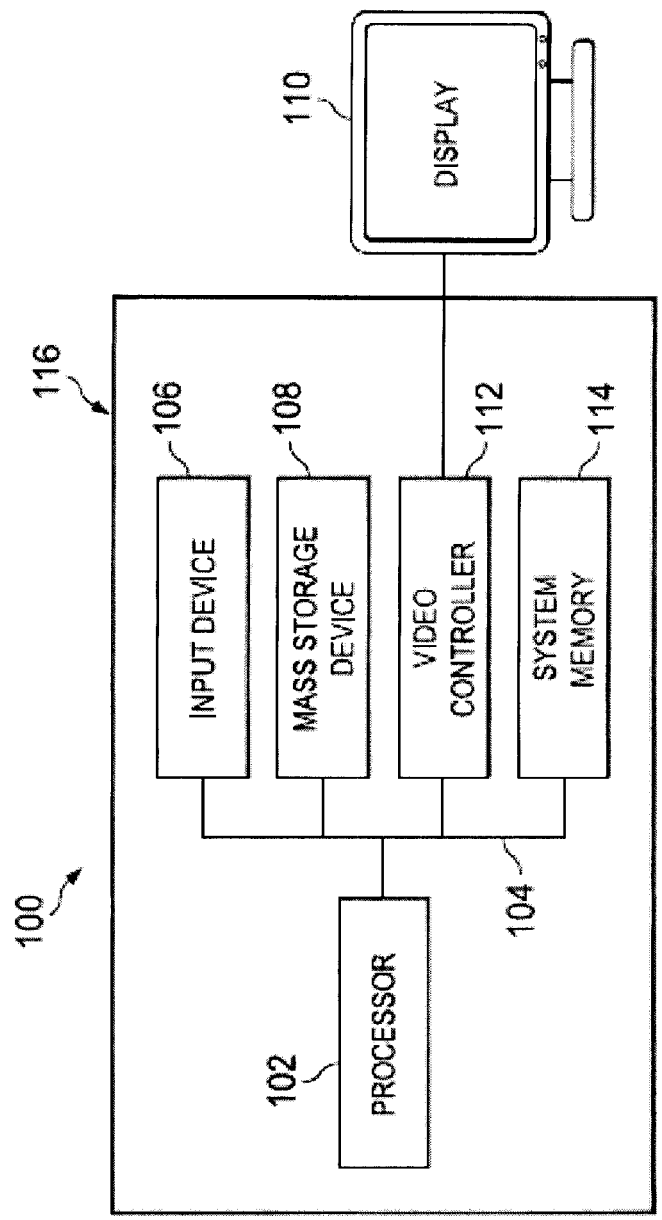
FIG. 1 is a schematic view illustrating an embodiment of an information handling system (IHS).

In one embodiment, an IHS 100 shown in FIG. 1 includes a processor 102, which is connected to a bus 104. Bus 104 serves as a connection between processor 102 and other components of IHS 100. An input device 106 is coupled to processor 102 to provide input to processor 102. Examples of input devices may include keyboards, touch-screens, pointing devices such as mice, trackballs, and track-pads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various components may be arbitrarily drawn in different scales for the sake of simplicity and clarity.

Generally, the present disclosure is directed to systems and methods for providing memory sparing in an IHS independently from and "invisible" to a memory controller in the IHS. As discussed above, conventional memory sparing systems utilize a memory controller to hold a region of memory in reserve and use that reserve memory region to replace an active memory region that is experiencing unrecoverable or excessive recoverable errors. In some embodiments, the present disclosure details a memory controller independent memory sparing system and method that is memory buffer-based and exhibits several advantages over conventional memory controller based systems and methods by, for example, providing increased flexibility, an ability to scale with capacity, and a variety of other advantages that will be recognized by those of skill in the art.

In some embodiments, the memory controller independent memory sparing system and method provides memory buffers that are capable of switching between designated regions of memory (e.g., channels, Dual Inline Memory Modules (DIMMs), ranks, multiple ranks, banks, etc.) along with firmware (e.g., a Basic Input/Output System (BIOS)) that coordinates the memory buffer activities. The memory buffers may be implemented as discrete components on a DIMM, a motherboard, a riser, and/or other modules known in the art, and/or may be incorporated into multi-die packages and assemblies including those that contain memory devices such as DRAM, and/or may be integrated within a memory device die. The memory buffers are capable of performing copies between memory regions during periods when the memory buffer is inactive. In a specific embodiment, detailed below, the memory buffers may utilize a sparing status, copy parameter information, a copy data buffer, and a copy address counter in order to perform such copying, with communication between memory buffers and the firmware conducted either out-of-band (e.g., via a System Management Bus (SMBus)) or in-band (e.g., if control word operations are supported).

In operation, if an error threshold of a memory region is exceeded, the firmware instructs the memory buffer to begin failover to a spare memory region. The memory buffer then updates the sparing status and, based on copy parameter information, begins copying information from the failing memory region to the spare memory region. In some embodiments, the memory buffer may perform copy operations by taking advantage of time periods when the memory buffer is not required to respond to access commands from the processor, while in other embodiments, the firmware may generate the time periods for copy operations. Furthermore, memory system refresh and/or calibration time periods may be exploited to create times periods where commands will not be issued such that copy operations may be performed.

For example, as is known in the art, memory systems require periodic calibration commands to adjust drive strength and terminations. These periods are long relative to the standard memory cycle time periods and can be adjusted both in length and frequency. The memory controller independent memory sparing system is operable to increase the frequency and duration of these calibration time periods to allow the memory buffer to use at least some of the calibration periods (i.e., "alternate" calibration periods) for copy operations.

The memory controller independent memory sparing system may also use refresh mechanisms for similar purposes. As is known in the art, refresh mechanisms may vary based on the refresh target (e.g., a rank, bank, or bank group), and with hidden ranks, multiple ranks may be indirectly targeted for refresh. The refresh command duration may be lengthened (e.g., doubled) to longer than a single standard refresh cycle time period, and there are mechanisms to force higher refresh rates (e.g., for high performance modes that create elevated temperatures in the memory). These higher refresh rates may be used by the memory controller independent memory sparing system to provide an increased number (e.g., twice) of refreshes to be issued, and the memory buffer may then use at least some of the refresh time periods (i.e., "alternate" refresh time periods) to perform copy operations. Other refresh mechanisms may be used to provide refresh time periods in which copy operations may be performed such as, for example, shortening the intervals between refreshes in order to create more refresh time periods for copy operations.

When using calibration and/or refresh time periods for copy operations, the copy operations may be performed using standard dynamic random access memory (DRAM) commands. However, because standard DRAM commands are typically performed according to well-defined inflexible timings, the memory buffer must ensure that its DRAM (or DIMM) bus will not be required for memory controller initiated transfers during the copy operations. For example, if the memory buffer is using calibration time periods to perform copy operations, current standards require the controller to close all memory pages and controller initiated accesses are not performed. In another example, if the memory buffer is using refresh time periods to perform copy operations, all memory pages may need to be closed behind the memory buffer before copy operations can begin. In some embodiments, the memory controller in these situations may be operated under a closed page policy. In other embodiments, the memory buffer may track memory commands to determine when there are no active rows to ensure that there will be no read or write bus conflicts during the copy operations performed in a refresh period. In other embodiments, the memory buffer may track memory commands and close/open pages as necessary to perform the copy operations, while ensuring that the closed/opened state of all pages is restored before the memory controller issues new memory commands. In such embodiments, any open/close actions during a copy operation may be made invisible to the memory controller's view of the page state.

As discussed above, embodiments of the memory controller-independent memory sparing system involve the use of standard controller features to generate copy operation time periods. In alternate embodiments, the firmware may perform read and write commands to a spare memory region, and these read and write commands will be distinguished by the memory controller independent memory sparing system as copy operations (e.g., because normal read and write commands would not be performed on the spare memory region). Intervening writes to the copy-from region at the copy address may be rerouted to the copy-to region, thus dealing with issues involving potentially stale data. In such embodiments, the firmware and the memory buffer may be kept synchronized by disabling patrol scrub operations.

Another issue that is dealt with by the memory controller-independent memory sparing system is that commands from the memory controller during copy operations to the region being copied to must be directed to valid regions. The memory buffer addresses this by comparing the address, rank, and/or other copy location identifiers in the command received from the memory controller to a copy address counter in the memory buffer in order to direct the command to a valid region: if the address in the command has already been copied to a copy-to region, access is directed to the copy-to region, while if the address in the command has not yet been copied to the copy-to region, access is directed to the copy-from region.

A specific embodiment of the memory controller-independent memory sparing system will now be described that is directed to memory sparing involving specific memory system components (e.g., ranks.) One of skill in the art will recognize that, in some embodiments, a 'rank' refers to a collection of Dynamic Random Access Memory Integrated Circuits (DRAM IC's) (e.g., 4 DRAM ICs, 8 DRAM ICs, 16 DRAM ICs, etc.) that may be accessed in parallel with a common command and address and with separate data busses to form a high bandwidth system bus. This embodiment is provided as an example of one implementation of the concepts of the present disclosure, and one of skill in the art will recognize that a wide variety of modification and substitution of equivalent memory system components in the memory controller-independent memory sparing system will fall within the scope of the present disclosure.

Figure 2:
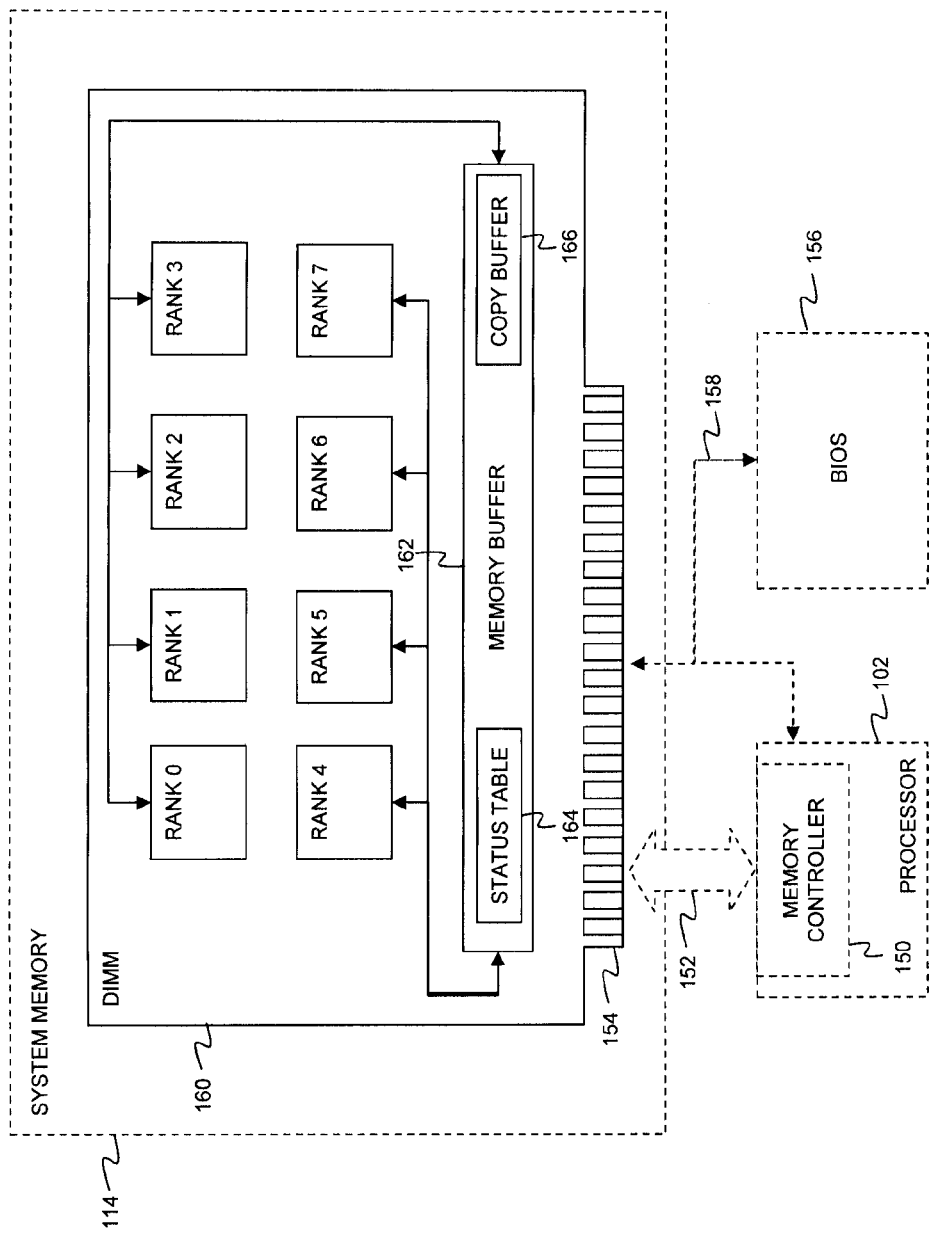
FIG. 2 is a schematic view illustrating an embodiment of a memory controller-independent memory sparing system.

FIG. 2 is a functional block diagram of a portion of the IHS 100 of FIG. 1 including the processor 102 and system memory 114 according to aspects of the present disclosure. In general, the IHS 100 is configured to selectively spare portions of the system memory 114 in a manner independent of a memory controller 150 associated with the system memory. For example, portions of the system memory 114 may be spared by rank, DRAM chip, address range, or by another grouping, and sparing may be managed by firmware (i.e. a BIOS) in the IHS and one or more memory buffers in the system memory without influence from the memory controller.

In the illustrated embodiment, the processor 102 includes an integrated memory controller 150 that manages the flow of data to and from the system memory 114. In alternate embodiments, however, the memory controller 150 may be separate from the processor 102. The system memory 114 is generally communicatively coupled to the processor 102 (and memory controller 150) via a channel 152. The channel 152 transmits data and command signals between the memory controller 150 and the system memory 114. In an embodiment, the channel 152 may support one, two, three, or more DIMM sockets per channel depending on the type of system memory 114 that is used. Further, although a single channel is shown, additional channels may be communicatively coupled to the memory controller 150.

Generally, one or more sockets accepting memory modules may communicate with the memory controller 150 via the channel 152. A Dual In-line Memory Module (DIMM) socket 154 is communicatively coupled to the memory controller 150 via the channel 152. In the illustrated embodiment, the DIMM socket 154 conforms to a DIMM standard promulgated by the Joint Electron Devices Engineering Council (JEDEC). Alternatively, the sockets 154 may include a single in-line memory module (SIMM) socket, another type of memory module socket, or may conform to a different standard such as the proposed Double Data Rate Four (DDR4), the DDR3 SDRAM standard, a future DDR standard promulgated by JEDEC, or another memory standard or proprietary design.

The IHS 100 further includes a management module 156 communicatively coupled to the processor 102 and the system memory 114 via an I/O channel 158. In the illustrated embodiment, the management module is a basic input/output system (BIOS) module. However, in other embodiments, it may be a baseboard management controller (BMC) or another in-band or out-of-band (OOB) controller. In some embodiments, the I/O channel 158 may be a part of a communication bus such as a system management bus (SMBus) or other system bus. In the illustrated embodiment, the BIOS module 156 is implemented on a non-volatile read-only memory (ROM) chip and includes firmware operable to detect and identify resources within IHS 100, provide the appropriate drivers for those resources, initialize those resources, and access those resources. In the illustrated embodiment, the BIOS module 156 includes memory initialization firmware to initialize the system memory 114. As an aspect of this, a BIOS memory initialization firmware module initially configures the memory sparing in system memory 114 (e.g., the BIOS memory initialization firmware module may communicate with BIOS functions such as memory controller initialization functions.) In alternative embodiments, however, a BMC, OOB, or other type of management module may configure memory sparing in IHS 100. Memory sparing configuration will be discussed in more detail below.

As shown in FIG. 2, a DIMM 160 is configured to mate with the DIMM socket 154. In some embodiments the DIMM socket and DIMM may conform to a standard such as the proposed DDR4 DIMM standards, the DDR3 DIMM standards, the DDR2 DIMM standards, or future standards promulgated by JEDEC or another standard setting organization. Further, in the illustrated embodiment, the DIMM 160 is a buffered DIMM such as a load-reduced DIMM (LRDIMM). The DIMM 160 includes memory storage locations that are logically divided into ranks 0, 1, 2, 3, 4, 5, 6, and 7. Although the DIMM 160 is shown as hosting 8 ranks, in alternative embodiments, it may host a greater or fewer number of ranks depending on the specifications of the DIMM. For example, a DDR4 DIMM may support up to 16 ranks. The DIMM 160 includes an onboard memory buffer 162 that is configured to buffer data transmitted between the DRAM chips on DIMM 160 and the memory controller 150 (i.e. in a Buffer-on-Board configuration). In the illustrated embodiment, the memory buffer 162 is a digital hardware circuit integrated into the DIMM, but, in alternative embodiments, it may be disposed on other hardware components such as a riser. The memory buffer 162 is configured to manage the memory sparing for the DIMM 160 at the direction of the BIOS 156. As a result, memory sparing is independent of, and invisible to, the memory controller 150. Thus, as detailed below, memory sparing performed in response to any fail-over of a rank due to a data error is handled by the memory buffer 162 and independent of the memory controller 150.

To manage the memory sparing on DIMM 160, the memory buffer 162 includes a status table 164. The status table 164 tracks a sparing status of physical ranges on the DIMM 160. In some embodiments, each sparing region may be comprised of memory locations that span across multiple DRAM chips, while in other embodiments, a single DRAM chip may include multiple sparing regions. In the example illustration described below, the sparing region is a rank, but one of skill in the art will recognize that a variety of different sparing regions will fall within the scope of the present disclosure. In the illustrated embodiment, the memory initialization firmware in the BIOS 156 populates the status table during memory initialization. The physical ranges of memory designated by the BIOS 156 as spare memory may be excluded from the available system memory passed to the system software (e.g., the operating system) by the BIOS 156, and thus will not be accessed during normal operations. Depending on the IHS DIMM configuration and the spare region designations, the portions of memory designated as spared memory may appear as "holes" to the system software. An example of a status table 164 is shown in Table 1 below:

TABLE 1

| Physical Range | Active Range | Spare | Active | Failed | Copy To | Copy From |
|---|---|---|---|---|---|---|
| 0 | 0 | 0 | 1 | 0 | 0 | 0 |
| 1 | N/A | N/A | N/A | 1 | 0 | 0 |
| 2 | 2 | 0 | 1 | 1 | 0 | 1 |
| 3 | 3 | 0 | 1 | 0 | 0 | 0 |
| 4 | 4 | 0 | 1 | 0 | 0 | 0 |
| 5 | 1 | 0 | 1 | 0 | 0 | 0 |
| 6 | 2 | 0 | 1 | 0 | 1 | 0 |
| 7 | N/A | 1 | 0 | 0 | 0 | 0 |

Because the system memory behind the memory buffer 162 in the embodiment illustrated in Table 1 is spared by physical range, each row in Table 1 corresponds to a physical range controlled by the memory buffer 162. For each physical range, data is kept about that physical range that indicates the current status of that physical range. As detailed below, the example in table 1 illustrates a situation where physical ranges 0, 1, 2, 3, and 4 are the normal physical ranges, physical ranges 5, 6, and 7 are the spare physical ranges, physical range 1 has previously failed and was spared by physical range 5, physical range 2 is currently failing and being spared by physical range 6, and physical range 7 is currently available to spare another physical range.

For each physical range, the table includes an associated active range for that physical range. In the example given in table 1, the physical ranges 0, 1, 2, 3, and 4 are the "normal physical ranges", with physical ranges 0, 2, 3, and 4 having themselves designated as their respective active range, while physical range 1 is not available because it has failed. Furthermore, physical ranges 5, 6, and 7 are "spare physical ranges", with physical range 5 having physical range 1 as its active range because it has being used to spare failed physical range 1, physical range 6 having physical range 2 as its active range because it is being used to spare physical range 2, and physical range 7 having its active range not available because it is not currently being used to spare a normal physical range.

For each physical range, the table includes an associated spare condition for that physical range that indicates whether that physical range is available as a spare physical range. In the example in table 1, physical ranges 0, 2, 3, and 4 include a "0" as their spare condition as they are not available as a spare physical range, physical range 1 is not available because it has failed, physical ranges 5 and 6 include a "0" as their spare condition as they are being used to spare physical ranges 1 and 2, respectively, and physical range 7 includes a "1" as its spare condition as it is available to spare another physical range.

For each physical range, the table includes an associated active condition for that physical range that indicates whether that physical range is currently active. In the example in table 1, physical ranges 0, 3, 4, 5, 6, and 7 include a "1" as their active condition as they are currently being used to store data, physical range 1 is not available because it has failed, and physical range 7 includes a "0" as its active condition as it is currently not being used to store data.

For each physical range, the table includes an associated failed condition for that physical range that indicates whether that physical range has or is currently failing. In the example in table 1, physical ranges 0, 3, 4, 5, 6, and 7 include a "0" as their failed condition as they have not and are not failing, while physical ranges 1 and 2 include a "1" as their failed condition because physical range 1 has failed and physical range 2 is currently failing.

For each physical range, the table includes associated copy to and copy from conditions for that physical range that indicates whether that physical range is being copied from or copied to. In the example in table 1, only physical range 2 is being copied from (e.g., physical range 2 includes a "1" in the copy from condition) and only physical range 6 is being copied to (e.g., physical range 6 includes a "1" in the copy to condition), because physical range 2 is currently failing and physical range 6 is being used to spare physical range 2.

It should be understood that the above Table 1 is simply an example and the status table 164 may contain additional and/or different information and be configured differently in alternative embodiments. For example, table 1 includes a sparing status table for eight physical ranges of memory, but more or less physical ranges of memory are envisioned as falling within the scope of the present disclosure. In an embodiment, the BIOS 156 may keep a sparing status table similar to Table 1 for each memory buffer used for in the memory sparing system.

Figure 3:
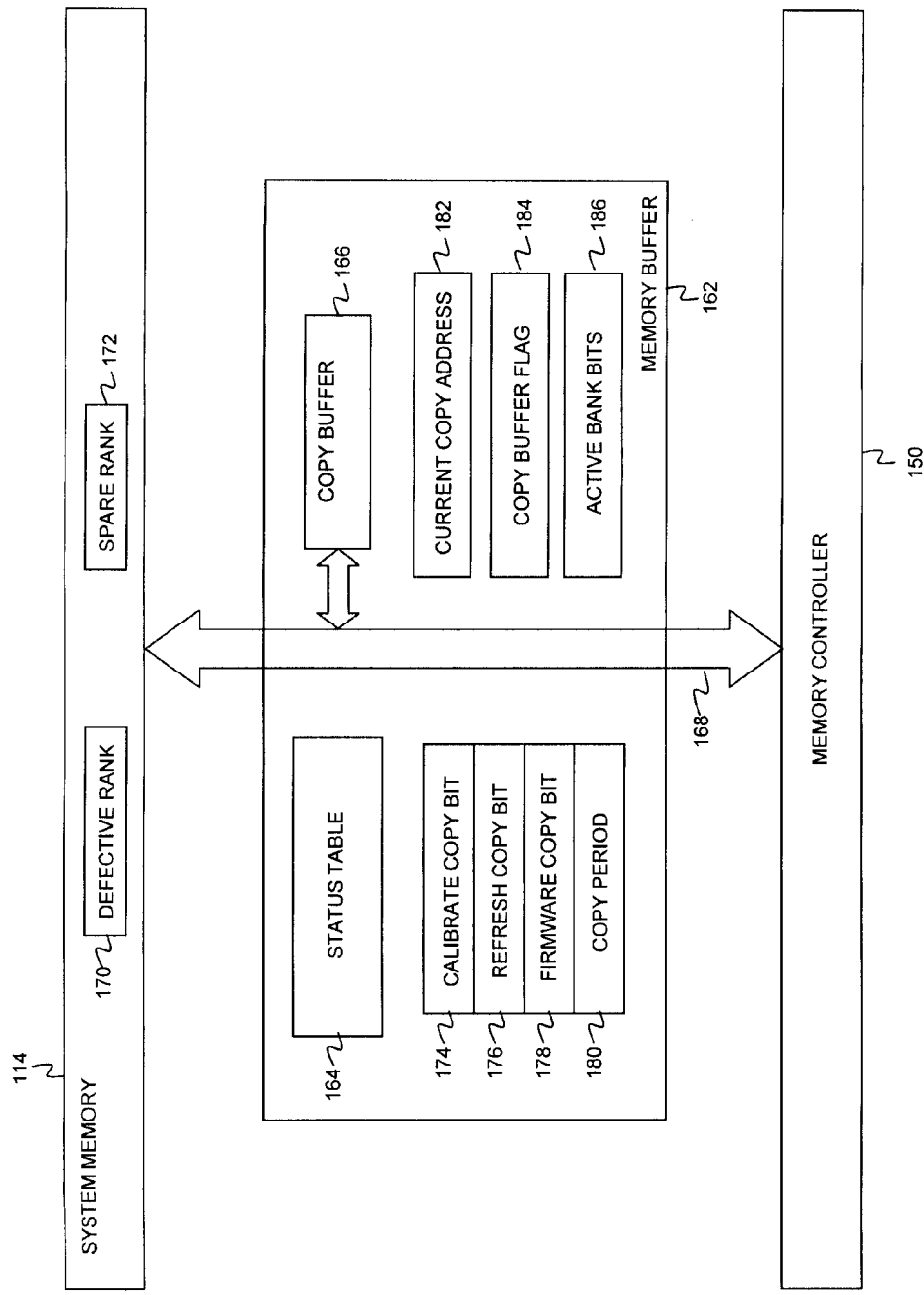
FIG. 3 is a functional block diagram illustrating an embodiment of the memory controller-independent memory sparing system of FIG. 2.

Referring now to FIG. 3, an embodiment of the memory controller 150, the memory buffer 162, and the system memory 114 is illustrated that details information that may be tracked or otherwise used by the memory buffer 162, and will be referenced in the method 400 described below. The memory controller 150, the memory buffer 162, and the system memory 114 communicate through a bus (or "channel") 168. A copy buffer 166 is included in the memory buffer 162 and coupled to the bus 168. The system memory 114 includes a defective rank 170 and a spare rank 172. In addition to the status table 164 and copy buffer 166, the memory buffer 162 stores a calibrate copy bit 174, a refresh copy bit 176, a firmware copy bit 178, and a copy period 180 as part of copy parameters that designate a copy operation period along with its relationship to a copy operation mode that, as discussed in detail below, may include a firmware copy operation mode, a calibration copy operation mode, and a refresh copy operation mode. The memory buffer 162 also stores a current copy address 182, a copy buffer flag 184, and active bank bits 186.

Figure 4A:
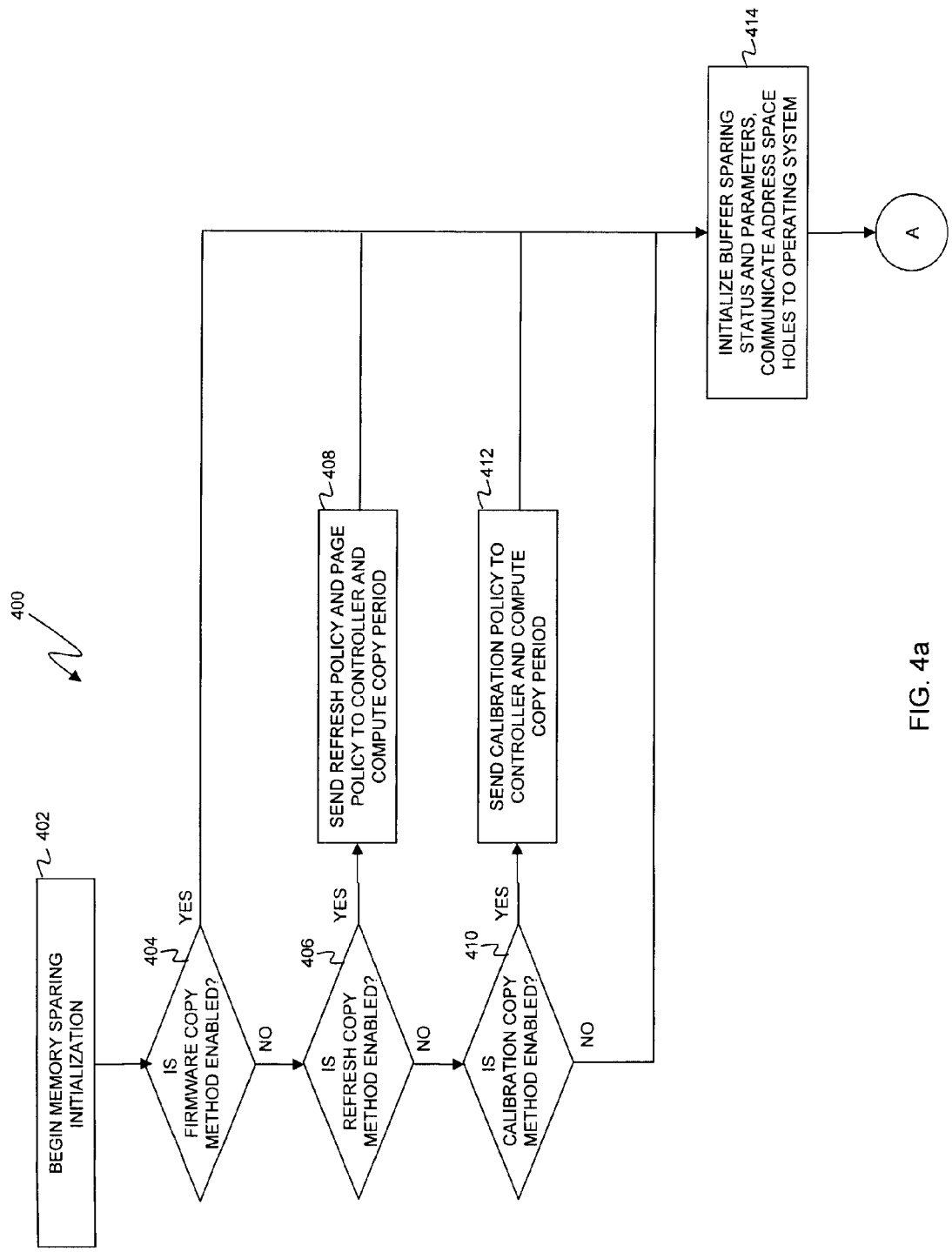
FIG. 4a is a flow chart illustrating an embodiment of a method for the initialization of memory sparing in a method for providing memory controller independent memory sparing.
Figure 4B:
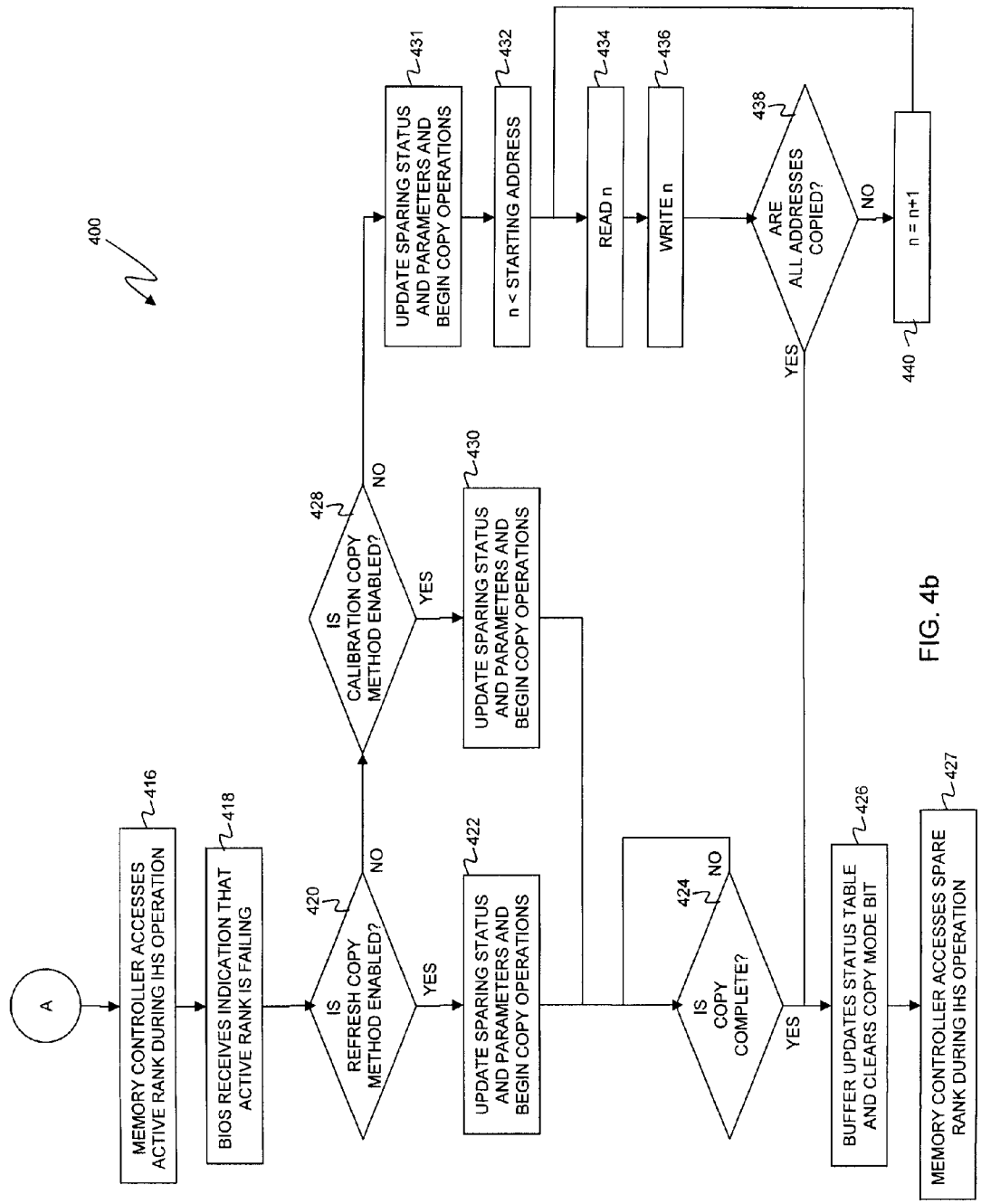
FIG. 4b is a flow chart illustrating an embodiment of a method for the activation of memory sparing regions in a method for providing memory controller independent memory sparing.

Referring now to FIGS. 4a and 4b, a method 400 for providing memory controller-independent memory sparing is illustrated that describes a general embodiment of the memory sparing system of the present disclosure including a memory sparing initialization method illustrated in FIG. 4a and a memory sparing region activation method illustrated in FIG. 4b. Embodiments of specific operations performed by the memory sparing system of the present disclosure are then discussed in more detail with reference to FIGS. 5, 6, and 7.

The method 400 begins at block 402 where memory sparing initialization begins. The method 400 then proceeds to decision block 404 where the BIOS 156 determines whether a firmware copy method is enabled. If a firmware copy method is not enabled, the method 400 proceeds to decision block 406 where the BIOS 156 determines whether a refresh copy method is enabled. If a refresh copy method is enabled, the method proceeds to block 408 where the BIOS 156 sends a refresh policy and a page policy to the memory controller 150 and computes a copy period. In an embodiment, at block 408, the BIOS 156 may set the refresh policies by instructing the memory controller 150 to increase the number of refresh periods (e.g., by enabling a higher thermal reliability mode) and/or shorten the intervals between refresh periods. In addition, the BIOS 156 may set the page policies by instructing the memory controller 150 to operate under a closed page policy, or otherwise operate such that all pages are closed behind the memory buffer 162 so that copies can begin. Furthermore, the BIOS 156 may compute the copy period 180 based on refresh period or periods and sends the copy period 180 to the memory buffer 162. In an embodiment, the BIOS computes the copy period 180 by determining number of copies possible during the designated (alternate) refresh period.

If a refresh copy method is not enabled, the method 400 proceeds to decision block 410 where the BIOS 156 determines whether a calibration copy method is enabled. If a calibration copy method is enabled, the method 400 proceeds to block 412 where the BIOS 156 sends a calibration policy to the memory controller 150 and computes a copy period. In an embodiment, the BIOS 156 may send the calibration policies by instructing the memory controller 150 to perform calibration operations for a provided length of time and/or frequency. Furthermore, the BIOS 156 may compute the copy period 180 based on calibration period or periods and sends the copy period 180 to the memory buffer 162. In an embodiment, the BIOS computes the copy period 180 by determining the number of copies possible during the designated (alternate) calibration period.

If the BIOS 156 determines at decision block 404 that a firmware copy method is enabled, or if the BIOS 156 determines at decision block 410 that a calibration copy method is not enabled, or following block 408 or 412, the method 400 proceeds to block 414 where the BIOS 156 initializes a buffer sparing status and buffer sparing parameters and communicates address space holes to the operating system.

For example, at block 414 of the method 400, the BIOS 156 may set up sparing associations and the sparing status table 164 in the memory buffer 162. In an embodiment, a sparing status table 164 similar to that illustrated and described above with reference to Table 1 is set up. Local copies of the sparing status table 164 may also be stored in the BIOS 156. The buffer sparing status tables are initialized according to the desired level of sparing through out-of-band methods (e.g., via a System Management Bus (SMBus) or in-band methods (e.g., if control word operations are supported.) In addition, the BIOS 156 may also communicate serial presence detect information such as, for example, latencies, such that basic DRAM cycles may be performed, along with a copy count compatible with a selected copy operation mode (e.g., a firmware copy operation mode, calibration copy operation mode, or refresh copy operation mode, discussed in further detail below). Advanced Configuration and Power Interface (ACPI) methods such as, for example, the ACPI E820 memory reporting interface, may be used to communicate the location of memory holes to the operating system. In an embodiment, at block 414, the BIOS sets the appropriate copy mode bit (the calibrate copy mode bit 174, the refresh copy mode bit 176, or the firmware copy mode bit 178, depending on which mode was determined as enabled in blocks 404, 406, and 410 of the method 400).

Referring to FIG. 4b, following block 414, the method 400 then proceeds to the activation of memory sparing regions, which begins at block 416 with the memory controller 150 accessing active ranks during IHS operation. As is known in the art, the memory controller 150 may access active ranks in the system memory 114 and perform reads and writes to those active ranks. The method 400 then proceeds to block 418 where the BIOS 156 receives an indication that an active rank is failing. In an embodiment, the BIOS 156 may determine that the number of errors associated with an active rank has exceeded a predetermined threshold and, in response, determine that that active rank is failing. However, a variety of other memory failure detection techniques will fall within the scope of the present disclosure. In response to determining that an active rank is failing, the method 400 proceeds depending on a copy operation mode that has been enabled in the system, each of which is detailed below.

In an embodiment, upon determining that an active rank is failing in block 418 of the method 400, the method 400 proceeds to block 420 where the BIOS 156 determines whether a refresh copy method has been enabled. In an embodiment, the BIOS 156 determines that the refresh copy mode operation has been enabled if the refresh copy mode bit 176 in the memory buffer 162 has been set. If the refresh copy method has been enabled, the method 400 proceeds to block 422 where the BIOS updates a sparing status and sparing parameters and begins copy operations, described in further detail below. The method 400 then proceeds to decision block 424 where the BIOS 156 determines whether copy operations are complete. If copy operations are not complete, the method 400 continues to monitor whether copy operations are complete. When copy operations are complete, the method 400 proceeds to block 426 where memory buffer 162 updates the sparing status table and clears the copy mode bit 174, 176, or 178. The method 400 then proceeds to block 427 where the memory controller 150 accesses the spare rank during IHS operations.

If, at decision block 420 it is determined that a refresh copy operation method is not enabled, the method 400 proceeds to decision block 428 where BIOS 156 determines whether a calibration copy method has been enabled. In an embodiment, the BIOS 156 determines that the calibration copy mode operation has been enabled if the calibrate copy mode bit 174 in the memory buffer 162 has been set. If the calibration copy method has been enabled, the method 400 proceeds to block 430 where the BIOS updates a sparing status and sparing parameters and begins copy operations, described in further detail below. The method 400 then proceeds to decision block 424 where the BIOS 156 determines whether copy operations are complete. If copy operations are not complete, the method 400 continues to monitor whether copy operations are complete. When copy operations are complete, the method 400 proceeds to block 426 where memory buffer 162 updates the sparing status table and clears the copy mode bit 174, 176, or 178. The method 400 then proceeds to block 427 where the memory controller 150 accesses the spare rank during IHS operations.

If, at decision block 428 it is determined that a calibration copy operation method is not enabled, the method 400 proceeds to block 431 where the BIOS updates a sparing status and sparing parameters and begins copy operations according to a firmware copy operation method, described in further detail below. To summarize, the method 400 proceeds to block 432 where a current copy address (n) is set as the starting address, block 434 where data in the current copy address is read from the failing memory region, and block 436 where the data read from the current copy address in block 434 is written to the spare memory region. It is noted that during the firmware copy operation, data received from the firmware is not used—the memory buffer performs the physical copy operation. The method 400 then proceeds to decision block 438 where the BIOS determines whether all addresses in the failing memory have been copied. If all addresses have not been copied, the method 400 proceeds to block 440 where the current copy address is incremented and the method 400 returns to blocks 434 and 436 to continue to read from failing memory region and write to the spare memory region. If at decision block 438 all addresses have been copied, the method 400 proceeds to block 426 where memory buffer 162 updates the sparing status table and clears the copy mode bit 174, 176, or 178. The method 400 then proceeds to block 427 where the memory controller 150 accesses the spare rank during IHS operations.

Thus, the system and method of the present disclosure generally provide a memory buffer 162 and BIOS 156 that operate to implement a memory sparing system that copies data from a failing rank of memory to a spare rank of memory independent of the memory controller 150 by operating according to either a refresh copy method where copying is performed during extra refresh periods provided by the memory controller 150 through instructions from the BIOS 156, a calibration copy method where copying is performed during extra calibration periods provided by the memory controller 150 through instructions from the BIOS 156, or a firmware copy method. Details of the buffer's operation during the refresh, calibration, and firmware copy methods will now be described in more detail in the embodiments discussed below.

Figure 5:
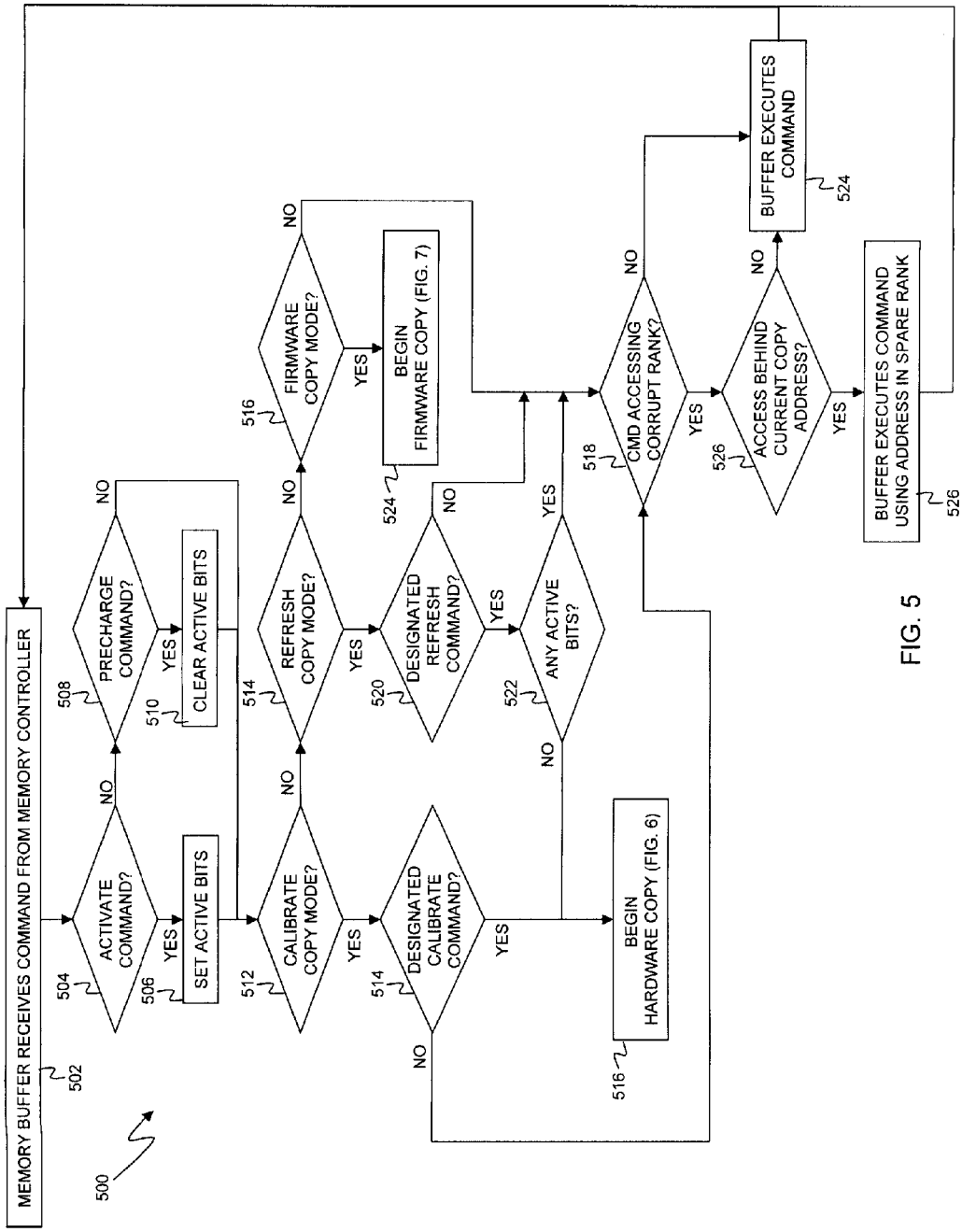
FIG. 5 is a flow chart illustrating an embodiment of a method for providing memory controller independent memory sparing.

Referring now to FIG. 5, a method 500 for providing memory controller independent memory sparing is illustrated and provides an embodiment illustrating how an active memory rank or region is copied to a spare memory rank or region. The method 500 begins at block 502 where the memory buffer 162 receives a command from the memory controller 150.

The method 500 then proceeds to blocks 504, 506, 508, and 510 where a table is created by the memory buffer 162 based on the commands received from the memory controller 150 in order to prevent copy operations from interfering with controller initiated operations. In an embodiment, DRAM read and write operations require multiple properly ordered commands, and in order to prevent potential interference between controller initiated operations and copy operations, the memory buffer 162 will ensure that there is no risk that an interfering command might occur. Within a DRAM, multiple interfering operations may be possible (e.g., one interfering operations may be possible for each bank.) An activate command to a bank may be followed by a data transfer (e.g., a read or write) command. A precharge command to a bank will put the bank back to a state where an interfering controller initiated command cannot be performed. Thus, the memory buffer 162 may track activate/precharge commands for each bank and ensure that interfering commands from the memory controller 150 will not occur. Other implementations of this concept are envisioned as falling within the scope of the present disclosure, including precharging and reactivating controller activated banks during the designated (alternate) refresh periods (if those periods are long enough.) It is noted that such a mechanism may not be performed for the calibration method because the memory controller 150 precharges all banks prior to a calibration operation. With respect to the firmware method, the firmware issues commands through the memory controller 150 such that interference does not occur.

At decision block 504, the memory buffer 162 determines whether the command from the memory controller 150 includes an activate command. In response to determining that the command from the memory controller 150 includes an activate command, the method 500 proceeds to block 506 where the memory controller 162 sets an active bank bit in the table. If at decision block 504 the command from the memory controller 150 does not include an activate command, the method 500 proceeds to decision block 508 where the memory buffer 162 determines whether the command from the memory controller 150 includes a pre-charge command. In response to determining that the command from the memory controller 150 including a pre-charge command, the method 500 proceeds to block 510 where the memory buffer 162 clears the active bank bits in the table. Thus, blocks 504, 506, 508, and 510 provide a table that indicates the presence of active banks and thus the potential for interference between refresh mode copy operations and memory controller 150 commands.

Following the setting of the active bank bit in the table in block 506, the clearing of the active bank bits in the table at block 510, or in the event the memory buffer 162 determines that the command from the memory controller 150 does not include an activate command at block 504 or a pre-charge command at block 508, the method 500 proceeds to decision blocks 512, 514, and 516 where the memory buffer 162 determines what copy operation mode the system is using as indicated by calibrate copy bit 174, the refresh copy bit 176, or the firmware copy bit 178, illustrated in FIG. 3. At decision block 512, the memory buffer 162 determines whether the system is in a calibration copy operation mode. If the memory buffer 162 determines that the system is not in the calibration copy operation mode, the method 500 proceeds to decision block 514 where the memory buffer 162 determines whether the system is in a refresh copy operation mode. If the memory buffer 162 determines that the system is not in the refresh copy operation mode, the method 500 proceeds to decision block 516 where the memory buffer 162 determines whether the system is in a firmware copy operation mode.

If, at decision block 512, the memory buffer 162 determines that the system is in the calibration copy operation mode, the method 500 then proceeds to decision block 514 where the memory buffer 162 determines whether the command from the memory controller 150 includes a designated (e.g., alternate) calibration command. As discussed above, the memory controller 150 may be instructed to perform extra or unneeded calibration operations that may then be used by the memory buffer 162 to perform copy operations for memory sparing. If, at decision block 514, the memory buffer 162 determines that the command from the memory controller 150 includes a designated calibration command, the method 500 proceeds to block 516 where a hardware copy, described in detail with reference to the method 600 of FIG.

6, begins. If, at decision block 514, the memory buffer 162 determines that the command from the memory controller 150 does not include a designated calibration command, the method 500 proceeds to decision block 518, discussed in further detail below.

If, at decision block 514, the memory buffer 162 determines that the system is in the refresh copy operation mode, the method 500 then proceeds to decision block 520 where the memory buffer 162 determines whether the command from the memory controller 150 includes a designated refresh command. As discussed above, the memory controller 150 may be instructed to perform extra or unneeded refresh operations that may then be used by the memory buffer 162 to perform copy operations for memory sparing. If, at decision block 520, the memory buffer 162 determines that the command from the memory controller 150 includes a designated refresh command, the method 500 proceeds to decision block 522 where the memory buffer 162 determines whether there are any active bits in the table to check for potential interference with memory controller 150 commands. If, at decision block 522, the memory buffer 162 determines that there are no active bits in the table, the method 500 proceeds to block 516 where a hardware copy, described in detail with reference to the method 600 of FIG. 6, begins. If, at decision block 520 the memory buffer 162 determines that the command from the memory controller 150 does not include a designated refresh command, or at decision block 522 it is determined that there are active bits in the table, the method 500 proceeds to decision block 518, discussed in further detail below.

If, at decision block 516, the memory buffer 162 determines that the system is in the firmware copy operation mode, the method 500 then proceeds to block 524, where a firmware copy, described in detail with reference to the method 700 of FIG. 7, begins. If, at decision block 516, the memory buffer 162 determines that the system is not in the firmware copy operation mode, the method 500 then proceeds to decision block 518.

At decision block 518, the memory buffer 162 determines whether the command from the memory controller 150 is attempting to access a corrupt rank. If, at decision block 518, the memory controller 162 determines that the command from the memory controller 150 is not attempting to access a corrupt rank, the method 500 proceeds to block 524 where the memory buffer 162 executes the command from the memory controller 150. If, at decision block 518, the memory buffer 162 determines that the command from the memory controller 150 is attempting to access a corrupt rank, the method 500 proceeds to decision block 526 where the memory buffer 162 determines whether the access of the corrupt rank is behind the current copy address 182. In an embodiment, the sparing operation begins performing copies at the first address in the region and increments that address (i.e., the current copy address) until the data transfer to the spare region is complete. Thus, an access from the controller to an address less than or behind the current copy address must be directed to the new (spare) region. If the access is greater than (or ahead of) the current copy address, the data has not been moved to the spare (new) region and the access is directed to the "failed" region. If the access of the corrupt rank is not behind the current copy address 182, the method 500 proceeds to block 524 where the memory buffer 162 executes the command from the memory controller 150. If the access of the corrupt rank is behind the current copy address 182, the method 500 proceeds to block 526 where the memory buffer 162 executes the command using the address of the spare rank. Following the memory buffer 162 executing the command from the memory controller 150 at block 524 or the memory buffer 162 executing the command using the address of the spare rank at block 526, the method 500 returns to block 502 where the memory buffer 162 receives a new command from the memory controller 150.

Figure 6:
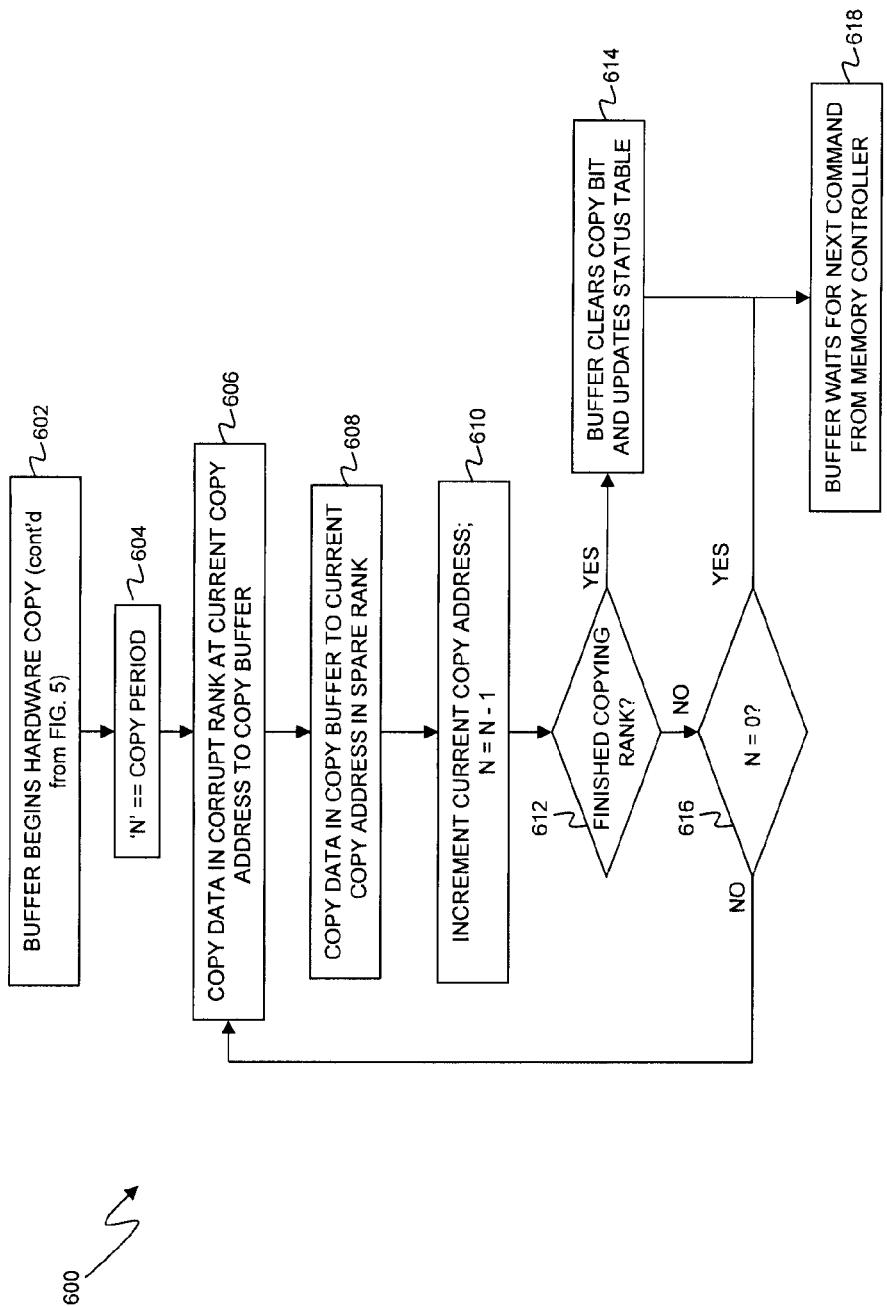
FIG. 6 is a flow chart illustrating an embodiment of a method for providing a hardware copy in the method for providing memory controller independent memory sparing of FIGS. 4a, 4b, and 5.

Referring now to FIG. 6, a method 600 for performing a hardware copy is illustrated. In an embodiment, the method 600 is performed at block 516 of the method 500, discussed above with reference to FIG. 5, in conjunction with the system being in the calibration copy operation mode or the refresh copy operation mode. The method 600 begins at block 602 where the memory buffer 162 begins the hardware copy and proceeds to block 604 where a copy period is set. In an embodiment, the memory buffer 162 sets the copy count N according to a value in the copy period 180 that is associated with the designated calibration or refresh command. The method 600 then proceeds to block 606 where data in the corrupt rank at the current copy address is copied to the copy buffer. In an embodiment, the memory buffer 162 copies data from the corrupt rank, which is located at a copy address that is stored in the current copy address 182, to the copy buffer 166. The method 600 then proceeds to block 608 where the data in the copy buffer 166 is copied to the current copy address in the spare rank. In an embodiment, the memory buffer 162 copies data from the copy buffer 166 to the spare rank at the copy address that is stored in the current copy address 182. The method 600 then proceeds to block 610 where the memory buffer 162 increments the copy address and decrements the copy count N. The method 600 then proceeds to decision block 612 where the memory buffer 162 determines whether the memory buffer 162 has finished copying the corrupt rank to the spare rank. If, at decision block 612, the memory buffer 162 has finished copying the corrupt rank, the method 600 proceeds to block 614 where the memory buffer 162 clears the copy bit and updates the sparing status table. If, at decision block 612, it is determined that the memory buffer 162 has not finished copying the corrupt rank to the spare rank, the method 600 proceeds to decision block 616 the memory buffer 162 determines whether the copy period has ended (e.g., N=0). If the copy period has not ended, the method 600 returns to block 606 and the memory buffer 162 continues to copy the corrupt rank to the spare rank. If the copy period has ended, or after block 614 of the method 600, the method 600 proceeds to block 618 where the memory buffer 162 waits for the next command from the memory controller 150.

Figure 7:
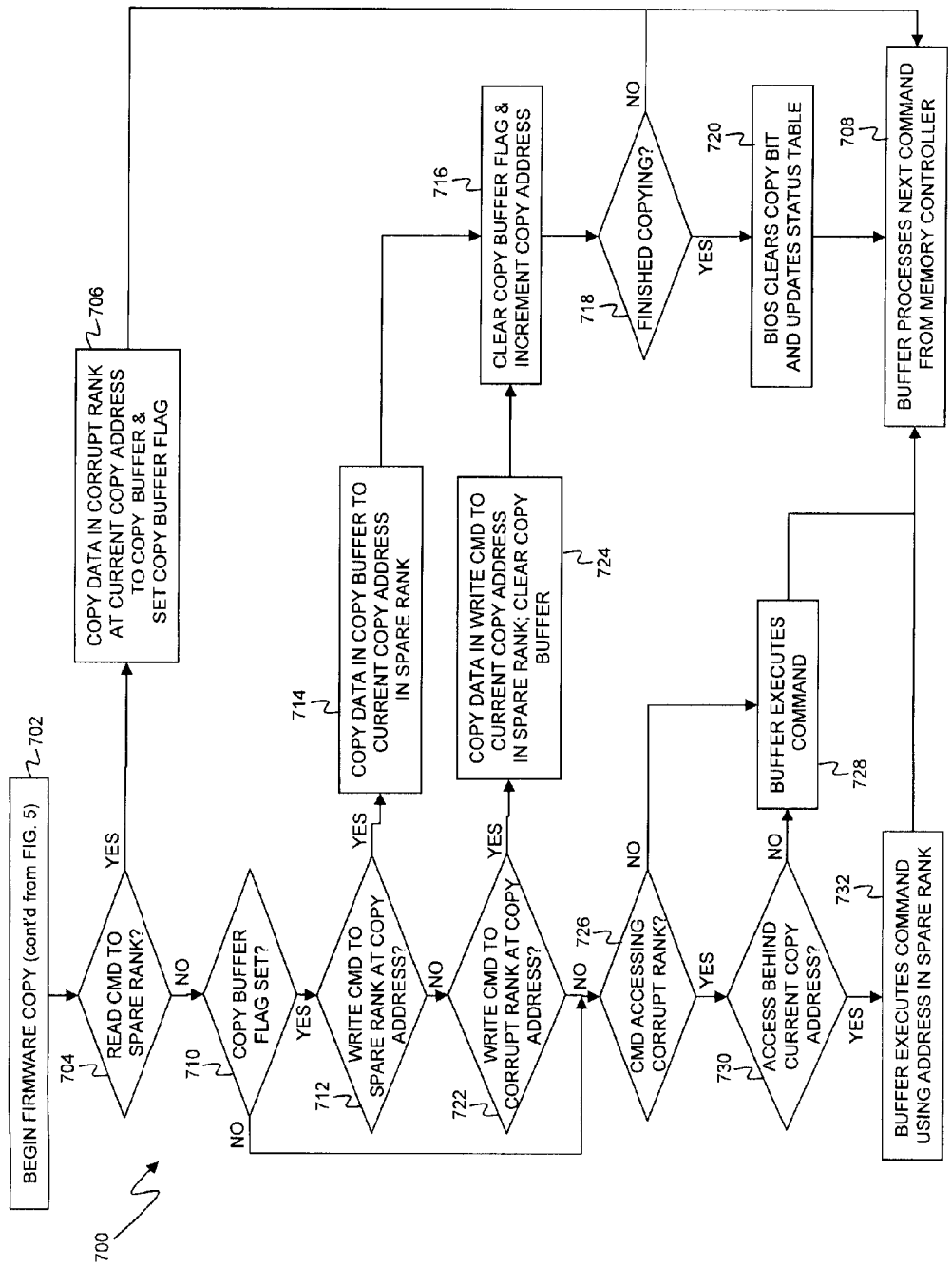
FIG. 7 is a flow chart illustrating an embodiment of a method for providing a firmware copy in the method for providing memory controller independent memory sparing of FIGS. 4a, 4b, and 5.

Referring now to FIG. 7, a method 700 for performing a firmware copy is illustrated. In this embodiment, instead of reserving intervals for the buffer to perform copies, the firmware method uses normal access methods to create opportunities for the buffer to perform copies. Because normal system accesses will not be directed to a spare region, the buffer may interpret accesses to the spare region as copy accesses. For a read, data may be copied into the buffer from the failing region, while for writes, data may be written from the buffer into the spare region. Because the firmware is using normal access methods through the controller, there is not an issue with interference. In an embodiment, the method 700 is performed at block 524 of the method 500, discussed above with reference to FIG. 5, in conjunction with the system being in the firmware copy operation mode. The method 700 begins at block 702 where a firmware copy begins. The method 700 then proceeds to decision block 704 where the memory buffer 162 determines whether the command received from the memory controller 150 is a read command to the spare rank. If, at decision block 704, the memory buffer 162 determines that the command from the memory controller 150 is a read command to the spare rank, the method 700 proceeds to block 706 where data at a copy address in the corrupt rank that is the current copy address 182 is copied to the copy buffer 166 and the copy buffer flag 184 is set. The method 700 then proceeds to block 708 where the memory buffer 162 processes the next command from the memory controller 150.

If, at decision block 704, the memory buffer 162 determines that the command from the memory controller 150 is not a read command to the spare rank, the method 700 proceeds to decision block 710 where the memory buffer 162 determines whether the copy buffer flag 184 is set. If the copy buffer flag 184 is set, the method 700 proceeds to decision block 712 where the memory buffer 162 determines whether the command from the memory controller 150 is a write command to the spare rank at the copy address. If the command from the memory controller 150 is a write command to the spare rank at the copy address, the method 700 proceeds to block 714 where the memory buffer 162 copies data in the copy buffer 166 to an address in the spare rank that corresponds to the current copy address 182. The method 700 then proceeds to block 716 where the memory buffer 162 clears the copy buffer flag 184 and increments the current copy address 182. The method 700 then proceeds to decision block 718 where the memory buffer 162 determines whether the memory buffer 162 is finished copying the data from the corrupt rank to the spare rank. If the memory buffer 162 is not finished copying the data from the corrupt rank to the spare rank, the method 700 proceeds to block 708 where the memory buffer 162 processes the next command from the memory controller 150. If the memory buffer 162 is finished copying the data from the corrupt rank to the spare rank, the method 700 proceeds to block 720 where the BIOS 156 clears the copy bit and updates the status table. The method 700 then proceeds to block 708 where the memory buffer 162 processes the next command from the memory controller 150.

If, at decision block 712, the memory buffer 162 determines that the command from the memory controller 150 is not a write command to the spare rank at the copy address, the method 700 proceeds to decision block 722 where the memory buffer determines whether the command from the memory controller 150 is a write command to a corrupt rank at the copy address. In an embodiment, at block 722, the memory buffer 162 determines whether the command from the memory controller 150 is a write command to a corrupt rank at the current copy address 182. If the command from the memory controller 150 is a write command to a corrupt rank at the current copy address, the method 700 proceeds to block 724 where the memory buffer 162 copies data in the write command to an address in the spare rank that corresponds to the current copy address 182, and the copy buffer 166 is cleared. The method 700 then proceeds to block 716 where the memory buffer clears the copy buffer flag 184 and increments the current copy address 182. The method 700 then proceeds to decision block 718 where the memory buffer 162 determines whether the memory buffer 162 is finished copying the data from the corrupt rank to the spare rank. If the memory buffer 162 is not finished copying the data from the corrupt rank to the spare rank, the method 700 proceeds to block 708 where the memory buffer 162 processes the next command from the memory controller 150. If the memory buffer 162 is finished copying the data from the corrupt rank to the spare rank, the method 700 proceeds to block 720 where the BIOS 156 clears the copy bit and updates the status table. The method 700 then proceeds to block 708 where the memory buffer 162 processes the next command from the memory controller 150.

If at decision block 710 the memory buffer 162 determines that the copy buffer flag 184 is not set, or at decision block 722 the memory buffer 162 determines that the command from the memory controller 150 is not a write command to a corrupt rank at the copy address, the method 700 proceeds to decision block 726 where the memory buffer 162 determines whether the command from the memory controller 150 is attempting to access a corrupt rank. If, at decision block 726, the memory buffer 162 determines that the command from the memory controller 150 is not attempting to access a corrupt rank, the method 700 proceeds to block 728 where the memory buffer executes the command. The method 700 then proceeds to block 708 where the memory buffer 162 processes the next command from the memory controller 150. If, at decision block 726, the memory buffer 162 determines that the command from the memory controller 150 is attempting to access a corrupt rank, the method 700 proceeds to decision block 730 where the memory buffer 162 determines whether the access is being attempted behind the current copy address 182. If the access is not being attempted behind the current copy address 182, the method 700 proceeds to blocks 728 and then 708 where the memory buffer executes the command and then processes the next command from the memory controller 150. If the access is being attempted behind the current copy address 182, the method 700 proceeds to blocks 732 where the memory buffer executes the command using the address in the spare rank, and then to block 708 where the memory buffer processes the next command from the memory controller 150.

Thus, a system and method have been described that provides for memory sparing that is independent of the memory controller by using a BIOS and memory buffer to perform copy operations during BIOS-initiated extra calibration or refresh periods, or in response to commands from the BIOS. Such a system and method provides for several advantages over conventional memory controller systems and methods. For example, such systems and methods may be provided on all processor types (e.g., lower end/lower cost processors without native sparing capability, do not require uniform populations of DIMMs across the IHS, are able to exploit memory regions that are not visible to the memory controller, can be supported with (RAS) features such as mirroring or lockstep (e.g., the present disclosure teaches memory sparing systems that provide value when combined with RAS features—after a mirrored failover, a spare rank in the memory sparing system of the present disclosure may be switched in), and do not require the interruption of system operations to perform copy operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory device, comprising:
   a connection that is configured to transmit signals to a memory controller and firmware and receive signals from the memory controller and firmware;
   a first memory region and a second memory region; and
   a memory buffer coupling the first memory region and the second memory region to the connection, wherein the memory buffer is configured, in response to operations performed by the firmware that include an instruction provided by the firmware to the memory controller to produce at least one additional calibration operation time period and the provision of the at least one additional calibration operation time period by the firmware to the memory buffer, to perform copy operations during the at least one additional calibration operation lime period and without instruction from the memory controller in order to copy data from the first memory region to the second memory region, and wherein the memory buffer is further configured to route requests from the memory controller to one of the first memory region and the second memory region.

2. The memory device of claim 1, wherein the first memory region is a failing memory region and the second memory region is a spare memory region.

3. The memory device of claim 1, wherein the memory buffer is further configured, in response to operations performed by the firmware that include an instruction provided by the firmware to the memory controller to produce at least one additional refresh operation time period and the provision of the at least one additional refresh operation time period by the firmware to the memory buffer, perform copy operations during the at least one additional refresh operation time period and without instruction from the memory controller in order to copy data from the first memory region to the second memory region.

4. The memory device of claim 1, wherein the memory buffer is further configured, in response to operations performed by the firmware that include an instruction provided by the firmware to perform a data transfer operation to the second memory region, to perform copy operations without instruction from the memory controller in order to copy data from the first memory region to the second memory region.

5. The memory device of claim 4, wherein the memory buffer is further configured to:
  determine that a controller operation initiated by the memory controller is attempting to access the first memory region;
  determine an attempted access address in the first memory region and a current copy address associated with the copy operations; and
  in response to the attempted access address being ahead of the current copy address, execute the controller operation using the first memory region;
  in response to the attempted access address being behind of the current copy address, execute the controller operation using the second memory region.

6. A memory device, comprising:
  a connection that is configured to transmit signals to a memory controller and firmware and receive signals from the memory controller and firmware;
  a first memory region and a second memory region; and
  a memory buffer coupling the first memory region and the second memory region to the connection, wherein the memory buffer is configured, in response to operations performed by the firmware that include an instruction provided by the firmware to the memory controller to produce at least one additional refresh operation time period and the provision of the at least one additional refresh operation time period by the firmware to the memory buffer, to:
    create a table using commands received from the memory controller;
    perform copy operations during the at least one additional refresh operation time period and without instruction from the memory controller in order to copy t, data from the first memory region to the second memory region; and
    use the table to prevent the copy operations performed during the at least one additional refresh operation time period from interfering with controller operations initiated by the memory controller, wherein the memory buffer is further configured to route requests from the memory controller to one of the first memory region and the second memory region.

7. An information handling system (IHS), comprising:
  a memory controller;
  a memory device coupled to the memory controller and including:
    a first memory region and a second memory region; and
    a memory buffer coupled to the first memory region and the second memory region, wherein the memory buffer is configured to perform copy operations during at least one additional calibration operation time period and without instruction from the memory controller in order to copy data from the first memory region to the second memory region, and wherein the memory buffer is configured to route requests from the memory controller to one of the first memory region and the second memory region during the copy operations; and
  firmware coupled to the memory device, wherein the firmware is configured to perform firmware operations to cause the memory buffer to perform the copy operations without instruction from the memory controller, wherein the firmware operation include providing an instruction to the memory controller to execute the at least one additional calibration operation time period and providing the at least one additional calibration operation time period to the memory buffer.

8. The IHS of claim 7, wherein the first memory region is a failing memory region and the second memory region is a spare memory region.

9. The IHS of claim 7, wherein the firmware is further configured to perform firmware operations that include providing an instruction to the memory controller to provide at least one additional refresh operation time period and providing the at least one additional refresh operation time period to the memory buffer, and wherein the memory buffer is configured to performs the copy operations during the at least one additional refresh operation time period and without instruction from the memory controller in order to copy data from the first memory region to the second memory region.

10. The IHS of claim 7, wherein the firmware is further configured to perform firmware operations that include providing an instruction to perform a data transfer operation to the second memory region, and wherein the memory buffer is further configured, in response to detecting the instruction to perform the data transfer operation to the second memory region, to perform the copy operation without instruction from the memory controller in order to copy data from the first memory region to the second memory region.

11. The IHS of claim 10, wherein the memory buffer is further configured to:
  determine that a controller operation initiated by the memory controller is attempting to access the first memory region;
  determine an attempted access address in the first memory region and a current copy address associated with the copy operations; and
  in response to the attempted access address being ahead of the current copy address, execute the controller operation using the first memory region;
  in response to the attempted access address being behind of the current copy address, execute the controller operation using the second memory region.

12. An information handling system (IHS), comprising:
a memory controller;
a memory device coupled to the memory controller and including:
a first memory region and a second memory region; and
a memory buffer coupled to the first memory region and the second memory region; wherein the memory buffer is configured to:
create a table using commands received from the memory controller;
perform copy operation during at least one additional refresh operation time period and without instruction from the memory controller in order to copy data from the first memory region to the second memory region; and
use the table to prevent the copy operations performed during the at least one additional refresh operation time period from interfering with controller operations initiated by the memory controller; and
firmware coupled to the memory device, wherein the firmware is operable to perform firmware operation to cause the memory buffer to perform 0the copy operations without instruction from the memory controller, wherein the firmware operations include providing an instruction to the memory controller to provide the at least one additional refresh operation time period and proving the at least one additional refresh operation time period to the memory buffer, and wherein the memory buffer is operable to route requests from the memory controller to one of the memory region and the second memory region during the copy operations.

13. A method for sparing memory, comprising:
providing a memory device;
detecting a failing memory region that is coupled to the memory device;
receiving at least one additional calibration operation time period from firmwave;
performing copy operations during the at least one additional calibration operation time period and without instruction from a memory controller in order to copy data from the failing memory region to a spare memory region that is coupled to the memory device; and
routing requests from the memory controller to one of the failing memory region and the spare memory region during the copy operations.

14. The method of claim 13, further comprising:
receiving at least one additional refresh operation time period from the firmware; and
performing copy operations during the at least one additional refresh operation time period and without instruction from the memory controller in order to copy data from the failing memory region to the spare memory region that is couple to the memory device.

15. The method of claim 13, further comprising;
receiving an instruction from the firmware to perform a data transfer operation to the spare memory region; and
performing copy operations without instruction from the memory controller in response to receiving the instruction to perform the data transfer operation to the spare memory region.

16. The method of claim 15, further comprising:
determining that a controller operation initiated by the memory controller is attempting to access the failing memory region;
determining an attempted access address in the failing memory region and a current copy address associated with the copy operations; and
in response to the attempted access address being ahead of the current copy address, executing the controller operation using the failing memory region;
in response to the attempted access address being behind of the current copy address, executing the controller operation using the spare memory region.

17. A method for sparing memory, comprising:
proving a memory device;
detecting a failing memory region that is coupled to the memory device;
creating a table using commands received from a memory controller;
performing copy operation without instruction from the memory controller in order to copy data from the failing memory region to a spare memory region that is coupled to the memory device, wherein the copy operation are performed in response to firmware operation performed by firmware;
using the table to prevent the copy operations performed during the at least one additional refresh operation time period from interfering with controller operations initiated by the memory controller; and
routing requests from the memory controller to one of the failing memory region and the spare memory region during the copy operation.

* * * * *